United States Patent [19]

Angara

[11] Patent Number: 4,872,277

[45] Date of Patent: Oct. 10, 1989

[54] CALENDAR ASSEMBLY

[76] Inventor: Rao V. Angara, 156 Mineral Springs Ave., Passaic, N.J. 07055

[21] Appl. No.: 86,686

[22] Filed: Aug. 18, 1987

[51] Int. Cl.[4] .......... G01D 3/10

[52] U.S. Cl. .......... 40/117

[58] Field of Search .......... 40/117

[56] References Cited

U.S. PATENT DOCUMENTS

| | | | |
|---|---|---|---|
| 801,495 | 10/1905 | Wilson | 40/107 |
| 1,992,508 | 2/1935 | Sharpe et al. | 40/111 |
| 2,338,377 | 1/1944 | Gatewood | 40/111 |
| 2,382,754 | 8/1945 | Turnbaugh | 40/111 |
| 2,505,341 | 4/1950 | Rankin | 40/117 |
| 2,575,929 | 11/1951 | Roesholm | 40/117 |
| 2,841,900 | 7/1958 | Ryan | 40/117 |
| 4,031,642 | 6/1977 | Aoki et al. | 40/111 |

*Primary Examiner*—Robert Peshock

*Attorney, Agent, or Firm*—Louis E. Marn

[57] ABSTRACT

There is disclosed a calendar assembly having a first chamber containing a display mechanism for at least fourteen separate calendar year systems, the first chamber mechanically coupled to a second chamber comprising an index mechanism which includes indices for establishing the relative position between the index mechanism and the calendar year system in order to locate a calendar year system for any pre-selected calendar year.

9 Claims, 22 Drawing Sheets

FIG. 3B

| | JANUARY | FEBRUARY | MARCH | APRIL |
|---|---|---|---|---|
| S | 1 8 15 22 29 | 5 12 19 26 | 4 11 18 25 | 1 8 15 22 29 |
| M | 2 9 16 23 30 | 6 13 20 27 | 5 12 19 26 | 2 9 16 23 30 |
| T | 3 10 17 24 31 | 7 14 21 28 | 6 13 20 27 | 3 10 17 24 |
| W | 4 11 18 25 | 1 8 15 22 29 | 7 14 21 28 | 4 11 18 25 |
| T | 5 12 19 26 | 2 9 16 23 | 1 8 15 22 29 | 5 12 19 26 |
| F | 6 13 20 27 | 3 10 17 24 | 2 9 16 23 30 | 6 13 20 27 |
| S | 7 14 21 28 | 4 11 18 25 | 3 10 17 24 31 | 7 14 21 28 |

2

| | MAY | JUNE | JULY | AUGUST |
|---|---|---|---|---|
| S | 6 13 20 27 | 3 10 17 24 | 1 8 15 22 29 | 5 12 19 26 |
| M | 7 14 21 28 | 4 11 18 25 | 2 9 16 23 30 | 6 13 20 27 |
| T | 1 8 15 22 29 | 5 12 19 26 | 3 10 17 24 31 | 7 14 21 28 |
| W | 2 9 16 23 30 | 6 13 20 27 | 4 11 18 25 | 1 8 15 22 29 |
| T | 3 10 17 24 31 | 7 14 21 28 | 5 12 19 26 | 2 9 16 23 30 |
| F | 4 11 18 25 | 1 8 15 22 29 | 6 13 20 27 | 3 10 17 24 31 |
| S | 5 12 19 26 | 2 9 16 23 30 | 7 14 21 28 | 4 11 18 25 |

| | SEPTEMBER | OCTOBER | NOVEMBER | DECEMBER |
|---|---|---|---|---|
| S | 30 2 9 16 23 | 7 14 21 28 | 4 11 18 25 | 30 2 9 16 23 |
| M | 3 10 17 24 | 1 8 15 22 29 | 5 12 19 26 | 31 3 10 17 24 |
| T | 4 11 18 25 | 2 9 16 23 30 | 6 13 20 27 | 4 11 18 25 |
| W | 5 12 19 26 | 3 10 17 24 31 | 7 14 21 28 | 5 12 19 26 |
| T | 6 13 20 27 | 4 11 18 25 | 1 8 15 22 29 | 6 13 20 27 |
| F | 7 14 21 28 | 5 12 19 26 | 2 9 16 23 30 | 7 14 21 28 |
| S | 1 8 15 22 29 | 6 13 20 27 | 3 10 17 24 | 1 8 15 22 29 |

3

| | JANUARY | FEBRUARY | MARCH | APRIL |
|---|---|---|---|---|
| S | 7 14 21 28 | 4 11 18 25 | 4 11 18 25 | 1 8 15 22 29 |
| M | 1 8 15 22 29 | 5 12 19 26 | 5 12 19 26 | 2 9 16 23 30 |
| T | 2 9 16 23 30 | 6 13 20 27 | 6 13 20 27 | 3 10 17 24 |
| W | 3 10 17 24 31 | 7 14 21 28 | 7 14 21 28 | 4 11 18 25 |
| T | 4 11 18 25 | 1 8 15 22 | 1 8 15 22 29 | 5 12 19 26 |
| F | 5 12 19 26 | 2 9 16 23 | 2 9 16 23 30 | 6 13 20 27 |
| S | 6 13 20 27 | 3 10 17 24 | 3 10 17 24 31 | 7 14 21 28 |

| | MAY | JUNE | JULY | AUGUST |
|---|---|---|---|---|
| S | 6 13 20 27 | 3 10 17 24 | 1 8 15 22 29 | 5 12 19 26 |
| M | 7 14 21 28 | 4 11 18 25 | 2 9 16 23 30 | 6 13 20 27 |
| T | 1 8 15 22 29 | 5 12 19 26 | 3 10 17 24 31 | 7 14 21 28 |
| W | 2 9 16 23 30 | 6 13 20 27 | 4 11 18 25 | 1 8 15 22 29 |
| T | 3 10 17 24 31 | 7 14 21 28 | 5 12 19 26 | 2 9 16 23 30 |
| F | 4 11 18 25 | 1 8 15 22 29 | 6 13 20 27 | 3 10 17 24 31 |
| S | 5 12 19 26 | 2 9 16 23 30 | 7 14 21 28 | 4 11 18 25 |

| | SEPTEMBER | OCTOBER | NOVEMBER | DECEMBER |
|---|---|---|---|---|
| S | 30 2 9 16 23 | 7 14 21 28 | 4 11 18 25 | 30 2 9 16 23 |
| M | 3 10 17 24 | 1 8 15 22 29 | 5 12 19 26 | 31 3 10 17 24 |
| T | 4 11 18 25 | 2 9 16 23 30 | 6 13 20 27 | 4 11 18 25 |
| W | 5 12 19 26 | 3 10 17 24 31 | 7 14 21 28 | 5 12 19 26 |
| T | 6 13 20 27 | 4 11 18 25 | 1 8 15 22 29 | 6 13 20 27 |
| F | 7 14 21 28 | 5 12 19 26 | 2 9 16 23 30 | 7 14 21 28 |
| S | 1 8 15 22 29 | 6 13 20 27 | 3 10 17 24 | 1 8 15 22 29 |

| | JANUARY | FEBRUARY | MARCH | APRIL |
|---|---|---|---|---|
| S | 7 14 21 28 | 4 11 18 25 | 31 3 10 17 24 | 7 14 21 28 |
| M | 1 8 15 22 29 | 5 12 19 26 | 4 11 18 25 | 1 8 15 22 29 |
| T | 2 9 16 23 30 | 6 13 20 27 | 5 12 19 26 | 2 9 16 23 30 |
| W | 3 10 17 24 31 | 7 14 21 28 | 6 13 20 27 | 3 10 17 24 |
| T | 4 11 18 25 | 1 8 15 22 29 | 7 14 21 28 | 4 11 18 25 |
| F | 5 12 19 26 | 2 9 16 23 | 1 8 15 22 29 | 5 12 19 26 |
| S | 6 13 20 27 | 3 10 17 24 | 2 9 16 23 30 | 6 13 20 27 |

| | MAY | JUNE | JULY | AUGUST |
|---|---|---|---|---|
| S | 5 12 19 26 | 30 2 9 16 23 | 7 14 21 28 | 4 11 18 25 |
| M | 6 13 20 27 | 3 10 17 24 | 1 8 15 22 29 | 5 12 19 26 |
| T | 7 14 21 28 | 4 11 18 25 | 2 9 16 23 30 | 6 13 20 27 |
| W | 1 8 15 22 29 | 5 12 19 26 | 3 10 17 24 31 | 7 14 21 28 |
| T | 2 9 16 23 30 | 6 13 20 27 | 4 11 18 25 | 1 8 15 22 29 |
| F | 3 10 17 24 31 | 7 14 21 28 | 5 12 19 26 | 2 9 16 23 30 |
| S | 4 11 18 25 | 1 8 15 22 29 | 6 13 20 27 | 3 10 17 24 31 |

| | SEPTEMBER | OCTOBER | NOVEMBER | DECEMBER |
|---|---|---|---|---|
| S | 1 8 15 22 29 | 6 13 20 27 | 3 10 17 24 | 1 8 15 22 29 |
| M | 2 9 16 23 30 | 7 14 21 28 | 4 11 18 25 | 2 9 16 23 30 |
| T | 3 10 17 24 | 1 8 15 22 29 | 5 12 19 26 | 3 10 17 24 31 |
| W | 4 11 18 25 | 2 9 16 23 30 | 6 13 20 27 | 4 11 18 25 |
| T | 5 12 19 26 | 3 10 17 24 31 | 7 14 21 28 | 5 12 19 26 |
| F | 6 13 20 27 | 4 11 18 25 | 1 8 15 22 29 | 6 13 20 27 |
| S | 7 14 21 28 | 5 12 19 26 | 2 9 16 23 30 | 7 14 21 28 |

FIG. 3G

7

| | JANUARY | FEBRUARY | MARCH | APRIL |
|---|---|---|---|---|
| S | 5 12 19 26 | 2 9 16 23 | 30 2 9 16 23 | 6 13 20 27 |
| M | 6 13 20 27 | 3 10 17 24 | 31 3 10 17 24 | 7 14 21 28 |
| T | 7 14 21 28 | 4 11 18 25 | 4 11 18 25 | 1 8 15 22 29 |
| W | 1 8 15 22 29 | 5 12 19 26 | 5 12 19 26 | 2 9 16 23 30 |
| T | 2 9 16 23 30 | 6 13 20 27 | 6 13 20 27 | 3 10 17 24 |
| F | 3 10 17 24 31 | 7 14 21 28 | 7 14 21 28 | 4 11 18 25 |
| S | 4 11 18 25 | 1 8 15 22 | 1 8 15 22 29 | 5 12 19 26 |

| | MAY | JUNE | JULY | AUGUST |
|---|---|---|---|---|
| S | 4 11 18 25 | 1 8 15 22 29 | 6 13 20 27 | 31 3 10 17 24 |
| M | 5 12 19 26 | 2 9 16 23 30 | 7 14 21 28 | 4 11 18 25 |
| T | 6 13 20 27 | 3 10 17 24 | 1 8 15 22 29 | 5 12 19 26 |
| W | 7 14 21 28 | 4 11 18 25 | 2 9 16 23 30 | 6 13 20 27 |
| T | 1 8 15 22 29 | 5 12 19 26 | 3 10 17 24 31 | 7 14 21 28 |
| F | 2 9 16 23 30 | 6 13 20 27 | 4 11 18 25 | 1 8 15 22 29 |
| S | 3 10 17 24 31 | 7 14 21 28 | 5 12 19 26 | 2 9 16 23 30 |

| | SEPTEMBER | OCTOBER | NOVEMBER | DECEMBER |
|---|---|---|---|---|
| S | 7 14 21 28 | 5 12 19 26 | 30 2 9 16 23 | 7 14 21 28 |
| M | 1 8 15 22 29 | 6 13 20 27 | 3 10 17 24 | 1 8 15 22 29 |
| T | 2 9 16 23 30 | 7 14 21 28 | 4 11 18 25 | 2 9 16 23 30 |
| W | 3 10 17 24 | 1 8 15 22 29 | 5 12 19 26 | 3 10 17 24 31 |
| T | 4 11 18 25 | 2 9 16 23 30 | 6 13 20 27 | 4 11 18 25 |
| F | 5 12 19 26 | 3 10 17 24 31 | 7 14 21 28 | 5 12 19 26 |
| S | 6 13 20 27 | 4 11 18 25 | 1 8 15 22 29 | 6 13 20 27 |

| | JANUARY | | | | |
|---|---|---|---|---|---|
| S | | 4 | 11 | 18 | 25 |
| M | | 5 | 12 | 19 | 26 |
| T | | 6 | 13 | 20 | 27 |
| W | | 7 | 14 | 21 | 28 |
| T | 1 | 8 | 15 | 22 | 29 |
| F | 2 | 9 | 16 | 23 | 30 |
| S | 3 | 10 | 17 | 24 | 31 |

| | FEBRUARY | | | | |
|---|---|---|---|---|---|
| S | 1 | 8 | 15 | 22 | 29 |
| M | 2 | 9 | 16 | 23 | |
| T | 3 | 10 | 17 | 24 | |
| W | 4 | 11 | 18 | 25 | |
| T | 5 | 12 | 19 | 26 | |
| F | 6 | 13 | 20 | 27 | |
| S | 7 | 14 | 21 | 28 | |

| | MARCH | | | | |
|---|---|---|---|---|---|
| S | | 7 | 14 | 21 | 28 |
| M | 1 | 8 | 15 | 22 | 29 |
| T | 2 | 9 | 16 | 23 | 30 |
| W | 3 | 10 | 17 | 24 | 31 |
| T | 4 | 11 | 18 | 25 | |
| F | 5 | 12 | 19 | 26 | |
| S | 6 | 13 | 20 | 27 | |

| | APRIL | | | | |
|---|---|---|---|---|---|
| S | | 4 | 11 | 18 | 25 |
| M | | 5 | 12 | 19 | 26 |
| T | | 6 | 13 | 20 | 27 |
| W | | 7 | 14 | 21 | 28 |
| T | 1 | 8 | 15 | 22 | 29 |
| F | 2 | 9 | 16 | 23 | 30 |
| S | 3 | 10 | 17 | 24 | |

| | MAY | | | | |
|---|---|---|---|---|---|
| S | 30 | 2 | 9 | 16 | 23 |
| M | 31 | 3 | 10 | 17 | 24 |
| T | | 4 | 11 | 18 | 25 |
| W | | 5 | 12 | 19 | 26 |
| T | | 6 | 13 | 20 | 27 |
| F | | 7 | 14 | 21 | 28 |
| S | 1 | 8 | 15 | 22 | 29 |

| | JUNE | | | | |
|---|---|---|---|---|---|
| S | | 6 | 13 | 20 | 27 |
| M | | 7 | 14 | 21 | 28 |
| T | 1 | 8 | 15 | 22 | 29 |
| W | 2 | 9 | 16 | 23 | 30 |
| T | 3 | 10 | 17 | 24 | |
| F | 4 | 11 | 18 | 25 | |
| S | 5 | 12 | 19 | 26 | |

| | JULY | | | | |
|---|---|---|---|---|---|
| S | | 4 | 11 | 18 | 25 |
| M | | 5 | 12 | 19 | 26 |
| T | | 6 | 13 | 20 | 27 |
| W | | 7 | 14 | 21 | 28 |
| T | 1 | 8 | 15 | 22 | 29 |
| F | 2 | 9 | 16 | 23 | 30 |
| S | 3 | 10 | 17 | 24 | 31 |

| | AUGUST | | | | |
|---|---|---|---|---|---|
| S | 1 | 8 | 15 | 22 | 29 |
| M | 2 | 9 | 16 | 23 | 30 |
| T | 3 | 10 | 17 | 24 | 31 |
| W | 4 | 11 | 18 | 25 | |
| T | 5 | 12 | 19 | 26 | |
| F | 6 | 13 | 20 | 27 | |
| S | 7 | 14 | 21 | 28 | |

| | SEPTEMBER | | | | |
|---|---|---|---|---|---|
| S | | 5 | 12 | 19 | 26 |
| M | | 6 | 13 | 20 | 27 |
| T | | 7 | 14 | 21 | 28 |
| W | 1 | 8 | 15 | 22 | 29 |
| T | 2 | 9 | 16 | 23 | 30 |
| F | 3 | 10 | 17 | 24 | |
| S | 4 | 11 | 18 | 25 | |

| | OCTOBER | | | | |
|---|---|---|---|---|---|
| S | 31 | 3 | 10 | 17 | 24 |
| M | | 4 | 11 | 18 | 25 |
| T | | 5 | 12 | 19 | 26 |
| W | | 6 | 13 | 20 | 27 |
| T | | 7 | 14 | 21 | 28 |
| F | 1 | 8 | 15 | 22 | 29 |
| S | 2 | 9 | 16 | 23 | 30 |

| | NOVEMBER | | | | |
|---|---|---|---|---|---|
| S | | 7 | 14 | 21 | 28 |
| M | 1 | 8 | 15 | 22 | 29 |
| T | 2 | 9 | 16 | 23 | 30 |
| W | 3 | 10 | 17 | 24 | |
| T | 4 | 11 | 18 | 25 | |
| F | 5 | 12 | 19 | 26 | |
| S | 6 | 13 | 20 | 27 | |

| | DECEMBER | | | | |
|---|---|---|---|---|---|
| S | | 5 | 12 | 19 | 26 |
| M | | 6 | 13 | 20 | 27 |
| T | | 7 | 14 | 21 | 28 |
| W | 1 | 8 | 15 | 22 | 29 |
| T | 2 | 9 | 16 | 23 | 30 |
| F | 3 | 10 | 17 | 24 | 31 |
| S | 4 | 11 | 18 | 25 | |

FIG. 3K

11

| | JANUARY | FEBRUARY | MARCH | APRIL |
|---|---|---|---|---|
| S | 31 3 10 17 24 | 7 14 21 28 | 7 14 21 28 | 4 11 18 25 |
| M | 4 11 18 25 | 1 8 15 22 | 1 8 15 22 29 | 5 12 19 26 |
| T | 5 12 19 26 | 2 9 16 23 | 2 9 16 23 30 | 6 13 20 27 |
| W | 6 13 20 27 | 3 10 17 24 | 3 10 17 24 31 | 7 14 21 28 |
| T | 7 14 21 28 | 4 11 18 25 | 4 11 18 25 | 1 8 15 22 29 |
| F | 1 8 15 22 29 | 5 12 19 26 | 5 12 19 26 | 2 9 16 23 30 |
| S | 2 9 16 23 30 | 6 13 20 27 | 6 13 20 27 | 3 10 17 24 |

| | MAY | JUNE | JULY | AUGUST |
|---|---|---|---|---|
| S | 30 2 9 16 23 | 6 13 20 27 | 4 11 18 25 | 1 8 15 22 29 |
| M | 31 3 10 17 24 | 7 14 21 28 | 5 12 19 26 | 2 9 16 23 30 |
| T | 4 11 18 25 | 1 8 15 22 29 | 6 13 20 27 | 3 10 17 24 31 |
| W | 5 12 19 26 | 2 9 16 23 30 | 7 14 21 28 | 4 11 18 25 |
| T | 6 13 20 27 | 3 10 17 24 | 1 8 15 22 29 | 5 12 19 26 |
| F | 7 14 21 28 | 4 11 18 25 | 2 9 16 23 30 | 6 13 20 27 |
| S | 1 8 15 22 29 | 5 12 19 26 | 3 10 17 24 31 | 7 14 21 28 |

| | SEPTEMBER | OCTOBER | NOVEMBER | DECEMBER |
|---|---|---|---|---|
| S | 5 12 19 26 | 31 3 10 17 24 | 7 14 21 28 | 5 12 19 26 |
| M | 6 13 20 27 | 4 11 18 25 | 1 8 15 22 29 | 6 13 20 27 |
| T | 7 14 21 28 | 5 12 19 26 | 2 9 16 23 30 | 7 14 21 28 |
| W | 1 8 15 22 29 | 6 13 20 27 | 3 10 17 24 | 1 8 15 22 29 |
| T | 2 9 16 23 30 | 7 14 21 28 | 4 11 18 25 | 2 9 16 23 30 |
| F | 3 10 17 24 | 1 8 15 22 29 | 5 12 19 26 | 3 10 17 24 31 |
| S | 4 11 18 25 | 2 9 16 23 30 | 6 13 20 27 | 4 11 18 25 |

FIG. 3L

12

| | JANUARY | FEBRUARY | MARCH | APRIL |
|---|---|---|---|---|
| S | 31 3 10 17 24 | 7 14 21 28 | 6 13 20 27 | 3 10 17 24 |
| M | 4 11 18 25 | 1 8 15 22 29 | 7 14 21 28 | 4 11 18 25 |
| T | 5 12 19 26 | 2 9 16 23 | 1 8 15 22 29 | 5 12 19 26 |
| W | 6 13 20 27 | 3 10 17 24 | 2 9 16 23 30 | 6 13 20 27 |
| T | 7 14 21 28 | 4 11 18 25 | 3 10 17 24 31 | 7 14 21 28 |
| F | 1 8 15 22 29 | 5 12 19 26 | 4 11 18 25 | 1 8 15 22 29 |
| S | 2 9 16 23 30 | 6 13 20 27 | 5 12 19 26 | 2 9 16 23 30 |

| | MAY | JUNE | JULY | AUGUST |
|---|---|---|---|---|
| S | 1 8 15 22 29 | 5 12 19 26 | 31 3 10 17 24 | 7 14 21 28 |
| M | 2 9 16 23 30 | 6 13 20 27 | 4 11 18 25 | 1 8 15 22 29 |
| T | 3 10 17 24 31 | 7 14 21 28 | 5 12 19 26 | 2 9 16 23 30 |
| W | 4 11 18 25 | 1 8 15 22 29 | 6 13 20 27 | 3 10 17 24 31 |
| T | 5 12 19 26 | 2 9 16 23 30 | 7 14 21 28 | 4 11 18 25 |
| F | 6 13 20 27 | 3 10 17 24 | 1 8 15 22 29 | 5 12 19 26 |
| S | 7 14 21 28 | 4 11 18 25 | 2 9 16 23 30 | 6 13 20 27 |

| | SEPTEMBER | OCTOBER | NOVEMBER | DECEMBER |
|---|---|---|---|---|
| S | 4 11 18 25 | 30 2 9 16 23 | 6 13 20 27 | 4 11 18 25 |
| M | 5 12 19 26 | 31 3 10 17 24 | 7 14 21 28 | 5 12 19 26 |
| T | 6 13 20 27 | 4 11 18 25 | 1 8 15 22 29 | 6 13 20 27 |
| W | 7 14 21 28 | 5 12 19 26 | 2 9 16 23 30 | 7 14 21 28 |
| T | 1 8 15 22 29 | 6 13 20 27 | 3 10 17 24 | 1 8 15 22 29 |
| F | 2 9 16 23 30 | 7 14 21 28 | 4 11 18 25 | 2 9 16 23 30 |
| S | 3 10 17 24 | 1 8 15 22 29 | 5 12 19 26 | 3 10 17 24 31 |

FIG. 3M

13

| | JANUARY | FEBRUARY | MARCH | APRIL |
|---|---|---|---|---|
| S | 30 2 9 16 23 | 6 13 20 27 | 6 13 20 27 | 3 10 17 24 |
| M | 31 3 10 17 24 | 7 14 21 28 | 7 14 21 28 | 4 11 18 25 |
| T | 4 11 18 25 | 1 8 15 22 | 1 8 15 22 29 | 5 12 19 26 |
| W | 5 12 19 26 | 2 9 16 23 | 2 9 16 23 30 | 6 13 20 27 |
| T | 6 13 20 27 | 3 10 17 24 | 3 10 17 24 31 | 7 14 21 28 |
| F | 7 14 21 28 | 4 11 18 25 | 4 11 18 25 | 1 8 15 22 29 |
| S | 1 8 15 22 29 | 5 12 19 26 | 5 12 19 26 | 2 9 16 23 30 |

| | MAY | JUNE | JULY | AUGUST |
|---|---|---|---|---|
| S | 1 8 15 22 29 | 5 12 19 26 | 31 3 10 17 24 | 7 14 21 28 |
| M | 2 9 16 23 30 | 6 13 20 27 | 4 11 18 25 | 1 8 15 22 29 |
| T | 3 10 17 24 31 | 7 14 21 28 | 5 12 19 26 | 2 9 16 23 30 |
| W | 4 11 18 25 | 1 8 15 22 29 | 6 13 20 27 | 3 10 17 24 31 |
| T | 5 12 19 26 | 2 9 16 23 30 | 7 14 21 28 | 4 11 18 25 |
| F | 6 13 20 27 | 3 10 17 24 | 1 8 15 22 29 | 5 12 19 26 |
| S | 7 14 21 28 | 4 11 18 25 | 2 9 16 23 30 | 6 13 20 27 |

| | SEPTEMBER | OCTOBER | NOVEMBER | DECEMBER |
|---|---|---|---|---|
| S | 4 11 18 25 | 30 2 9 16 23 | 6 13 20 27 | 4 11 18 25 |
| M | 5 12 19 26 | 31 3 10 17 24 | 7 14 21 28 | 5 12 19 26 |
| T | 6 13 20 27 | 4 11 18 25 | 1 8 15 22 29 | 6 13 20 27 |
| W | 7 14 21 28 | 5 12 19 26 | 2 9 16 23 30 | 7 14 21 28 |
| T | 1 8 15 22 29 | 6 13 20 27 | 3 10 17 24 | 1 8 15 22 29 |
| F | 2 9 16 23 30 | 7 14 21 28 | 4 11 18 25 | 2 9 16 23 30 |
| S | 3 10 17 24 | 1 8 15 22 29 | 5 12 19 26 | 3 10 17 24 31 |

FIG. 4

A.D. CALENDAR SYSTEM 65A 65B

| 15 / 27 19 / 23 | 0 | 1 | 2 | 3 | 4 | 5 | 6 | 7 | 8 | 9 |
|---|---|---|---|---|---|---|---|---|---|---|
| 0 | 3 | 13 | 10 | 7 | 4 | 1 | 12 | 9 | 6 | 3 |
| 1 | 5 | 1 | 13 | 9 | 7 | 3 | 1 | 11 | 9 | 5 |
| 2 | 7 | 4 | 1 | 12 | 9 | 6 | 3 | 14 | 11 | 8 |
| 3 | 9 | 7 | 3 | 1 | 11 | 9 | 5 | 3 | 13 | 11 |
| 4 | 12 | 9 | 6 | 3 | 14 | 11 | 8 | 5 | 2 | 13 |
| 5 | 1 | 11 | 9 | 5 | 3 | 13 | 11 | 7 | 5 | 1 |
| 6 | 3 | 14 | 11 | 8 | 5 | 2 | 13 | 10 | 7 | 4 |
| 7 | 5 | 3 | 13 | 11 | 7 | 5 | 1 | 13 | 9 | 7 |
| 8 | 8 | 5 | 2 | 13 | 10 | 7 | 4 | 1 | 12 | (9) |
| 9 | 11 | 7 | 5 | 1 | 13 | 9 | (7) | 3 | 1 | 11 |

Ex: (19) 98 Cal. No. (9)

TABLE 1

(23) 69 is cal. No. 7

CALENDARS (1 TO 14) IN A CENTURY

A.D. CALENDAR SYSTEM (contd)

66A 66B

| 17 / 29 21 / 25 | 0 | 1 | 2 | 3 | 4 | 5 | 6 | 7 | 8 | 9 |
|---|---|---|---|---|---|---|---|---|---|---|
| 0 | (11) | 7 | 4 | 1 | 12 | 9 | 6 | 3 | 14 | 11 |
| 1 | 13 | 9 | 7 | 3 | 1 | 11 | 9 | 5 | 3 | 13 |
| 2 | 1 | 12 | 9 | 6 | 3 | 14 | 11 | 8 | 5 | 2 |
| 3 | 3 | 1 | 11 | 9 | 5 | 3 | 13 | 11 | 7 | 5 |
| 4 | 6 | 3 | 14 | 11 | 8 | 5 | 2 | 13 | 10 | 7 |
| 5 | 9 | 5 | 3 | 13 | 11 | 7 | 5 | 1 | 13 | 9 |
| 6 | 11 | 8 | 5 | 2 | 13 | 10 | 7 | 4 | 1 | 12 |
| 7 | 13 | 11 | 7 | 5 | 1 | 13 | 9 | 7 | 3 | 1 |
| 8 | 2 | 13 | 10 | 7 | 4 | 1 | 12 | 9 | 6 | (3) |
| 9 | 5 | 1 | 13 | 9 | 7 | 3 | 1 | 11 | 9 | 5 |

(21) 00 is Cal. (11)

TABLE 3

(29) 98 is (3)

CALENDARS (1 TO 14) IN A CENTURY 32 is a leap year with cal. No. (10)

Ex. (20) 86-Cal. No. (5)

(16) 34-Cal. No. (1)

1843 is Cal. No. (1)

2284 is (6)

SEE HERE (20)

67A 67B

| 16 / 28 20 / 24 | 0 | 1 | 2 | 3 | 4 | 5 | 6 | 7 | 8 | 9 |
|---|---|---|---|---|---|---|---|---|---|---|
| 0 | 14 | (11) | 8 | 5 | 2 | 13 | 10 | 7 | 4 | 1 |
| 1 | 3 | 13 | 11 | 7 | 5 | 1 | 13 | 9 | 7 | 3 |
| 2 | 5 | 2 | 13 | (10) | 7 | 4 | 1 | 12 | 9 | 6 |
| 3 | 7 | 5 | 1 | 13 | 9 | 7 | 3 | 1 | 11 | 9 |
| 4 | 10 | 7 | 4 | (1) | 12 | 9 | 6 | 3 | 14 | 11 |
| 5 | 13 | 9 | 7 | 3 | 1 | 11 | 9 | 5 | 3 | 13 |
| 6 | 1 | 12 | 9 | 6 | 3 | 14 | 11 | 8 | (5) | 2 |
| 7 | 3 | 1 | 11 | 9 | 5 | 3 | 13 | 11 | 7 | 5 |
| 8 | 6 | 3 | 14 | 11 | 8 | 5 | 2 | 13 | 10 | 7 |
| 9 | 9 | 5 | 3 | 13 | 11 | 7 | 5 | 1 | 13 | 9 |

TABLE 2

Ex. (28) 10 Cal. No. (11)

CALENDAR EXAMPLES ( )

SEE HERE (18) 43

68A 68B

| 18 / 30 22 / 26 | 0 | 1 | 2 | 3 | 4 | 5 | 6 | 7 | 8 | 9 |
|---|---|---|---|---|---|---|---|---|---|---|
| 0 | (7) | 3 | 14 | 11 | 8 | 5 | 2 | 13 | 10 | 7 |
| 1 | 9 | 5 | 3 | 13 | 11 | 7 | 5 | 1 | 13 | 9 |
| 2 | 11 | 8 | 5 | 2 | 13 | 10 | 7 | 4 | 1 | 12 |
| 3 | 13 | 11 | 7 | 5 | (1) | 13 | 9 | 7 | 3 | 1 |
| 4 | 2 | 13 | 10 | 7 | 4 | 1 | 12 | 9 | (6) | 3 |
| 5 | 5 | 1 | 13 | 9 | 7 | 3 | 1 | 11 | 9 | 5 |
| 6 | 7 | 4 | 1 | 12 | 9 | 6 | 3 | 14 | 11 | 8 |
| 7 | 9 | 7 | 3 | 1 | 11 | 9 | 5 | 3 | 13 | 11 |
| 8 | 12 | 9 | 6 | 3 | 14 | 11 | 8 | 5 | 2 | 13 |
| 9 | 1 | 11 | 9 | 5 | 3 | 13 | 11 | 7 | 5 | 1 |

TABLE 4

(30) 00 IS Cal. No. (7)

CALENDAR EXAMPLES ( )

400 YEAR CALENDAR x x x x — * FIRST 3 DIGITS → ; LAST DIGIT ↓

TABLE 1

| * | 190 | 191 | 192 | 193 | 194 | 195 | 196 | 197 | 198 | 199 |
|---|---|---|---|---|---|---|---|---|---|---|
| 0 | 3 | 13 | 10 | 7 | 4 | 1 | 12 | 9 | 6 | 3 |
| 1 | 5 | 1 | 13 | 9 | 7 | 3 | 1 | 11 | 9 | 5 |
| 2 | 7 | 4 | 1 | 12 | 9 | 6 | 3 | 14 | 11 | 8 |
| 3 | 9 | 7 | 3 | 1 | 11 | 9 | 5 | 3 | 13 | 11 |
| 4 | 12 | 9 | 6 | 3 | 14 | 11 | 8 | 5 | 2 | 13 |
| 5 | 1 | 11 | 9 | 5 | 3 | 13 | 11 | 7 | 5 | 1 |
| 6 | 3 | 14 | 11 | 8 | 5 | 2 | 13 | 10 | 7 | 4 |
| 7 | 5 | 3 | 13 | 11 | 7 | 5 | 1 | 13 | 9 | 7 |
| 8 | 8 | 5 | 2 | 13 | 10 | 7 | 4 | 1 | 12 | 9 |
| 9 | 11 | 7 | 5 | 1 | 13 | 9 | 7 | 3 | 1 | 11 |

TABLE 2

| * | 200 | 201 | 202 | 203 | 204 | 205 | 206 | 207 | 208 | 209 |
|---|---|---|---|---|---|---|---|---|---|---|
| 0 | 14 | 11 | 8 | 5 | 2 | 13 | 10 | 7 | 4 | 1 |
| 1 | 3 | 13 | 11 | 7 | 5 | 1 | 13 | 9 | 7 | 3 |
| 2 | 5 | 2 | 13 | 10 | 7 | 4 | 1 | 12 | 9 | 6 |
| 3 | 7 | 5 | 1 | 13 | 9 | 7 | 3 | 1 | 11 | 9 |
| 4 | 10 | 7 | 4 | 1 | 12 | 9 | 6 | 3 | 14 | 11 |
| 5 | 13 | 9 | 7 | 3 | 1 | 11 | 9 | 5 | 3 | 13 |
| 6 | 1 | 12 | 9 | 6 | 3 | 14 | 11 | 8 | 5 | 2 |
| 7 | 3 | 1 | 11 | 9 | 5 | 3 | 13 | 11 | 7 | 5 |
| 8 | 6 | 3 | 14 | 11 | 8 | 5 | 2 | 13 | 10 | 7 |
| 9 | 9 | 5 | 3 | 13 | 11 | 7 | 5 | 1 | 13 | 9 |

TABLE 3

| * | 210 | 211 | 212 | 213 | 214 | 215 | 216 | 217 | 218 | 219 |
|---|---|---|---|---|---|---|---|---|---|---|
| 0 | 11 | 7 | 4 | 1 | 12 | 9 | 6 | 3 | 14 | 11 |
| 1 | 13 | 9 | 7 | 3 | 1 | 11 | 9 | 5 | 3 | 13 |
| 2 | 1 | 12 | 9 | 6 | 3 | 14 | 11 | 8 | 5 | 2 |
| 3 | 3 | 1 | 11 | 9 | 5 | 3 | 13 | 11 | 7 | 5 |
| 4 | 6 | 3 | 14 | 11 | 8 | 5 | 2 | 13 | 10 | 7 |
| 5 | 9 | 5 | 3 | 13 | 11 | 7 | 5 | 1 | 13 | 9 |
| 6 | 11 | 8 | 5 | 2 | 13 | 10 | 7 | 4 | 1 | 12 |
| 7 | 13 | 11 | 7 | 5 | 1 | 13 | 9 | 7 | 3 | 1 |
| 8 | 2 | 13 | 10 | 7 | 4 | 1 | 12 | 9 | 6 | 3 |
| 9 | 5 | 1 | 13 | 9 | 7 | 3 | 1 | 11 | 9 | 5 |

TABLE 4

| * | 220 | 221 | 222 | 223 | 224 | 225 | 226 | 227 | 228 | 229 |
|---|---|---|---|---|---|---|---|---|---|---|
| 0 | 7 | 3 | 14 | 11 | 8 | 5 | 2 | 13 | 10 | 7 |
| 1 | 9 | 5 | 3 | 13 | 11 | 7 | 5 | 1 | 13 | 9 |
| 2 | 11 | 8 | 5 | 2 | 13 | 10 | 7 | 4 | 1 | 12 |
| 3 | 13 | 11 | 7 | 5 | 1 | 13 | 9 | 7 | 3 | 1 |
| 4 | 2 | 13 | 10 | 7 | 4 | 1 | 12 | 9 | 6 | 3 |
| 5 | 5 | 1 | 13 | 9 | 7 | 3 | 1 | 11 | 9 | 5 |
| 6 | 7 | 4 | 1 | 12 | 9 | 6 | 3 | 14 | 11 | 8 |
| 7 | 9 | 7 | 3 | 1 | 11 | 9 | 5 | 3 | 13 | 11 |
| 8 | 12 | 9 | 6 | 3 | 14 | 11 | 8 | 5 | 2 | 13 |
| 9 | 1 | 11 | 9 | 5 | 3 | 13 | 11 | 7 | 5 | 1 |

FIG. 9

CALENDAR ASSEMBLY

FIELD OF INVENTION

This invention relates to an improved calendar assembly, and more particularly, to a calendar assembly for constructing the calendar of any predetermined year.

BACKGROUND OF THE INVENTION

Oftentimes, it is desirable and sometimes necessary to ascertain the day of the week in which a particular day of a particular year has fallen or will fall in the past or future respectively. Calendar manufacturers oftentimes provide past reference year calendars and future reference year calendars for the immediate preceding and successive years in question. However, in certain instances, it is desirous and necessary to project the day of the week in which a particular day fell, many years into the future or many years into the past. The present invention provides a mechanical assembly for precisely these projections.

OBJECTS OF THE PRESENT INVENTION

An object of the present invention is to provide a novel and improved calendar assembly.

Another object of the present invention is to provide a novel and improved calendar assembly permitting the reconstruction of past calendar years.

Yet another object of the present invention is to provide a novel calendar assembly permitting the construction of future calendar years.

SUMMARY OF THE INVENTION

These and other objects of the present invention are achieved by a calendar assembly having a first chamber containing a display mechanism for at least fourteen separate calendar year systems, the first chamber mechanically coupled to a second chamber comprising an index mechanism which includes indices for establishing the relative position between the index mechanism and the calendar year system in order to locate a calendar year system for any pre-selected calendar year.

BRIEF DESCRIPTION OF THE DRAWINGS

The invention will be more clearly understood by reference to the following detailed description of an exemplary embodiment thereof in conjunction with the accompanying drawings wherein:

FIG. 4 is an example of the centennial digit indices and years one through ninety-nine indices.

FIG. 9 is an example of the 400 year index for use with the second embodiment of the calendar year chamber.

DETAILED DESCRIPTION OF THE DRAWINGS

Figure 1:
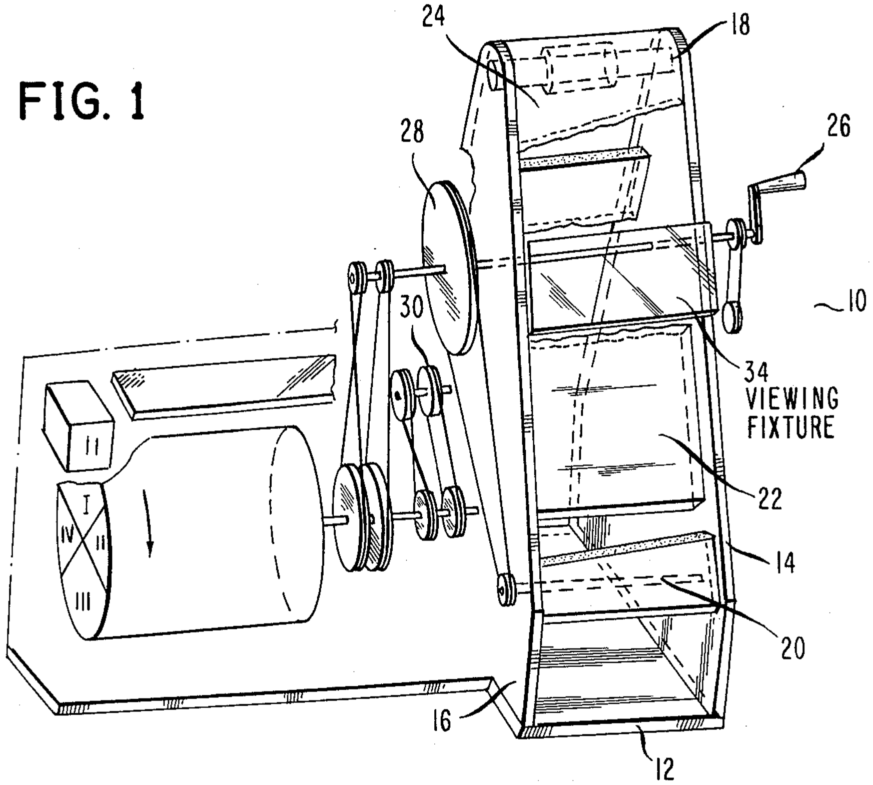
FIG. 1 is a perspective view of a first embodiment of the calendar year chamber.

Referring to FIG. 1, there is shown the calendar year chamber designated generally as 10. The calendar year chamber comprises a generally planer base plate 12 supporting two generally triangular side panels 14 and 16 which are perpendicular to base plate 12. Positioned at the vertices of triangular side panels 14 and 16, and positioned therebetween generally perpendicular thereto, are rotatable rollers 18, 20 and 22. Rollers 18, 20 and 22 support a timing belt 24 within calendar year chamber 10. Timing belt 24 is rotated within calendar chamber 10 by means of lever arm 26 which is centrally disposed through side panels 14 and 16 to pulley 28 which in turn is secured by bolt means 30 to roller 18. In this configuration, timing belt 24 is rotated within calendar chamber 10 by movement of lever arm 26 in a clockwise or counterclockwise direction. The mechanical advantage between pulley 28 and and roller 18 is a ratio of six to one.

A viewing fixture or screen 34 is secured perpendicular between side panels 14 and 16 to index a particular calendar year which is secured to timing belt 24.

Figure 3:
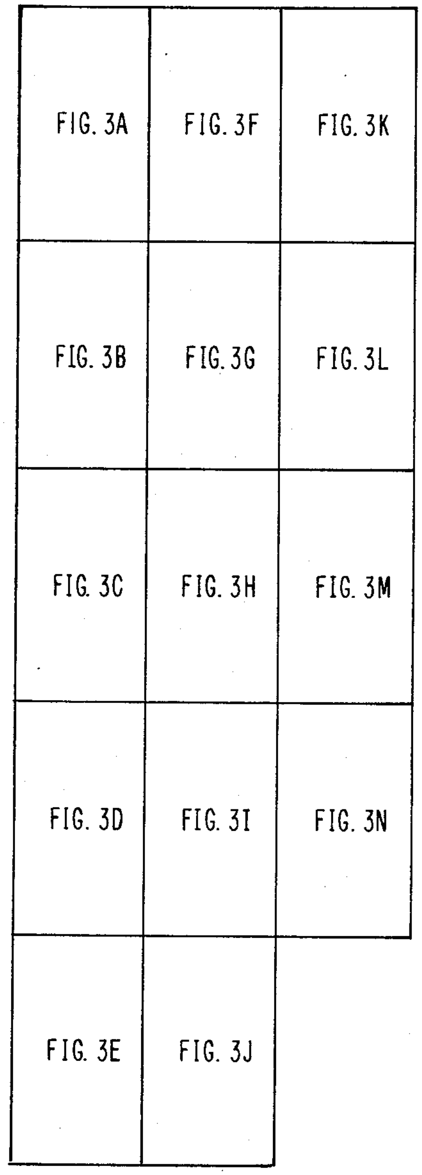
FIG. 3 is an example of the day/date calendar year systems.
Figure 3A:
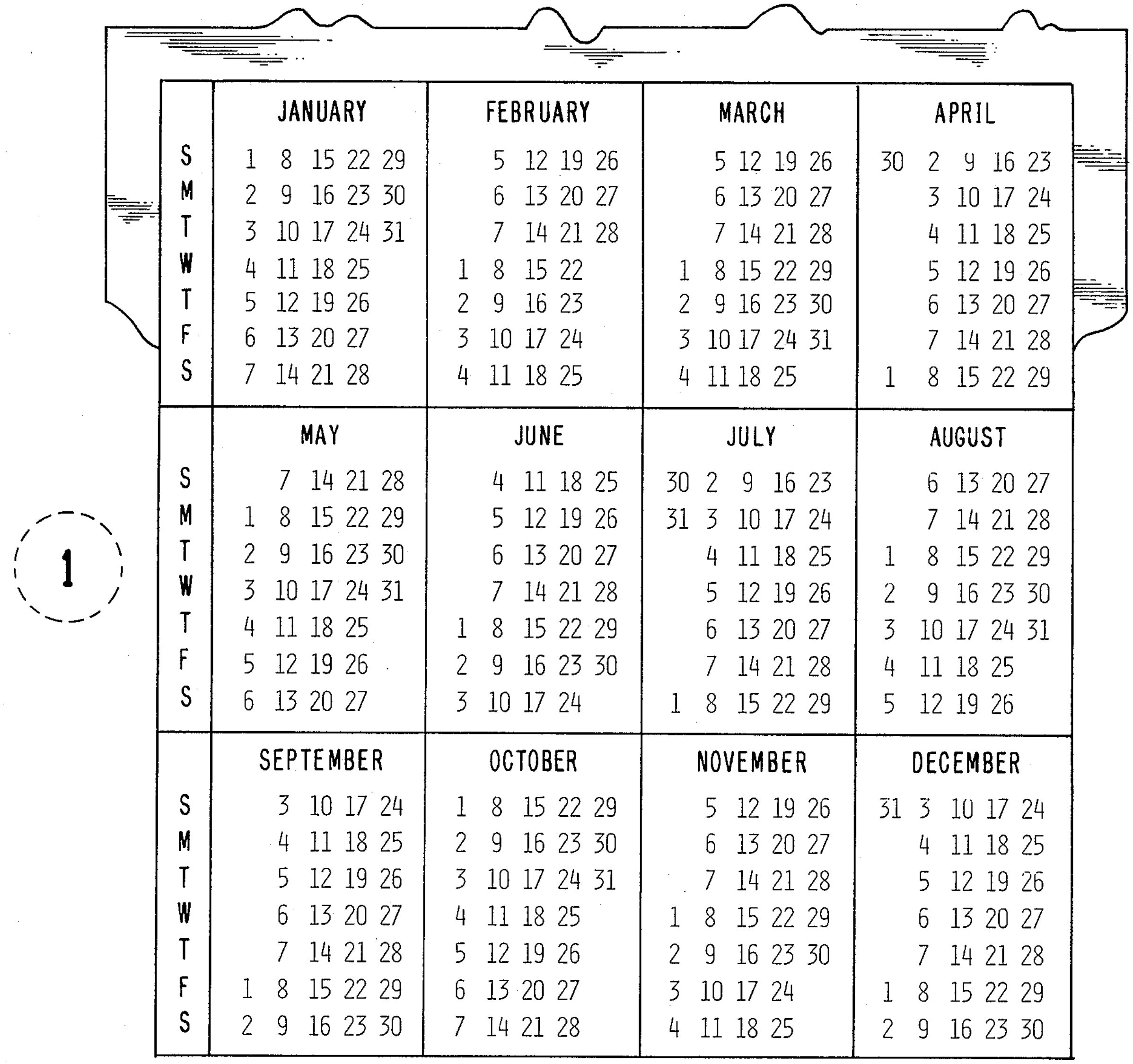
Figure 3C:
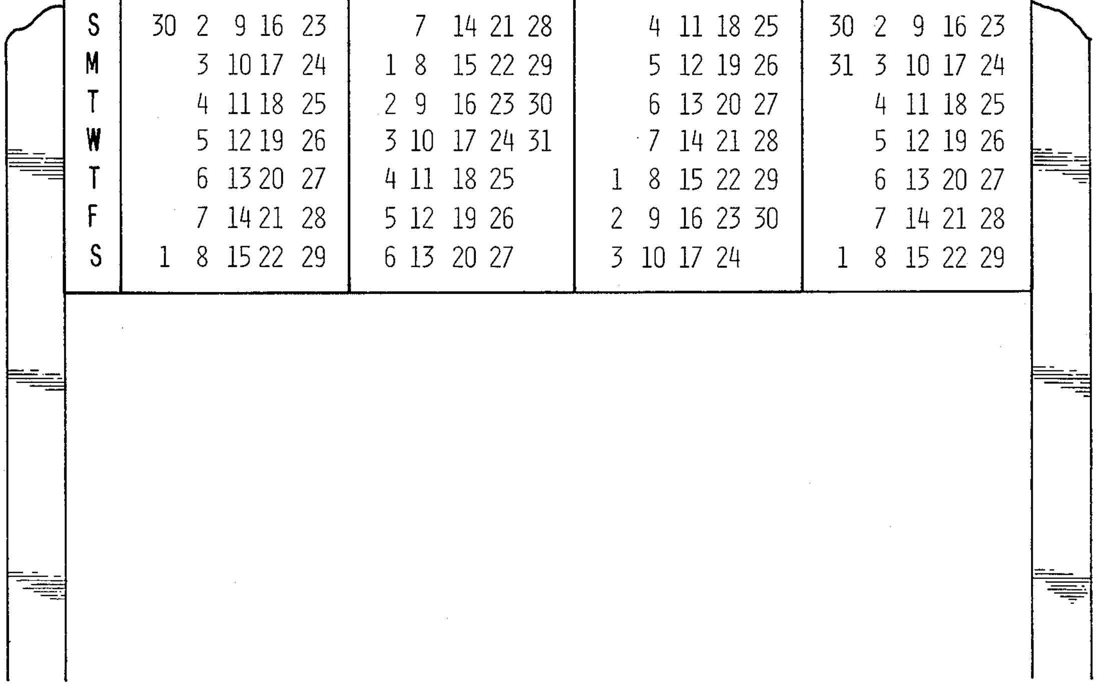
Figure 3D:
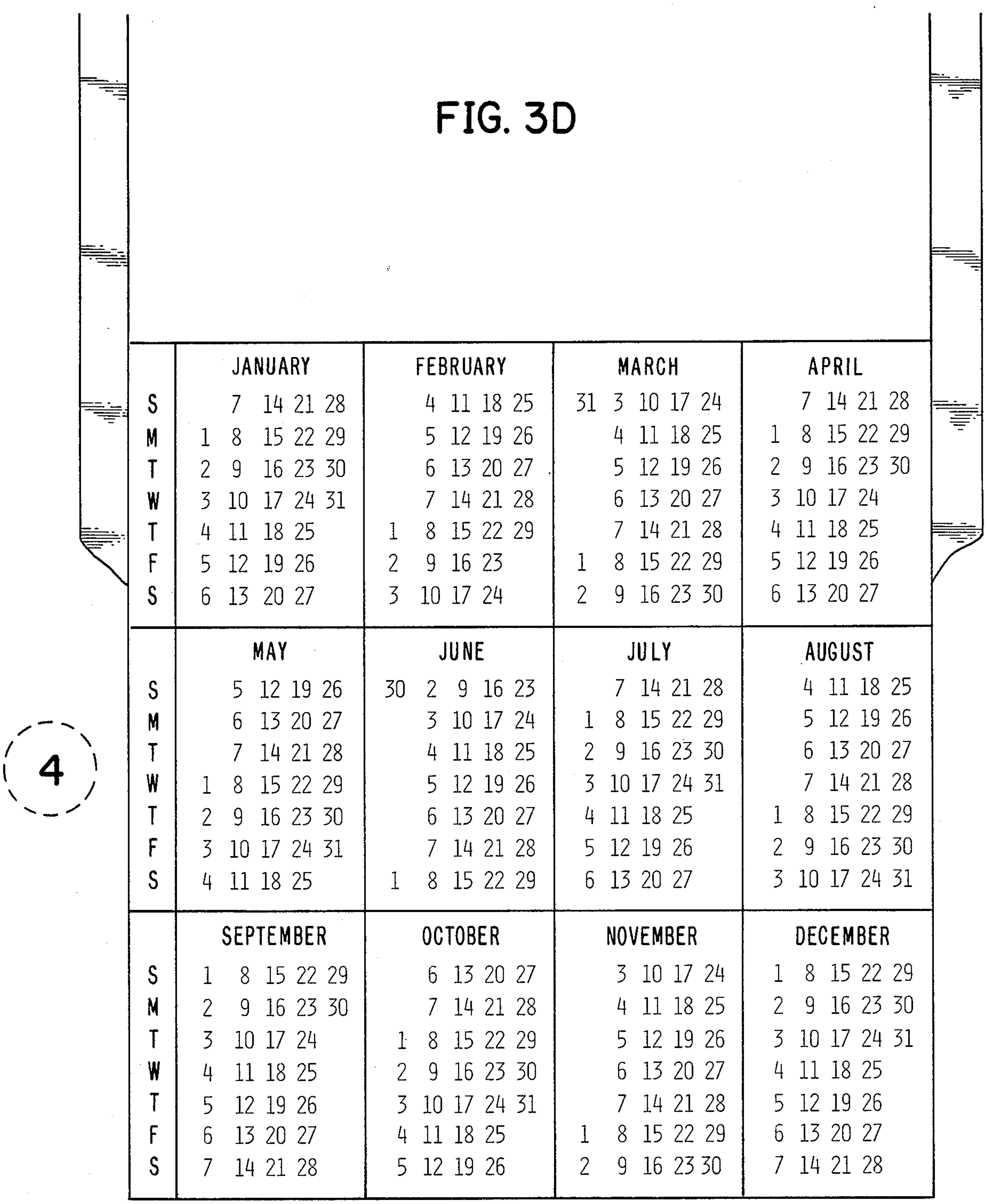
Figure 3E:
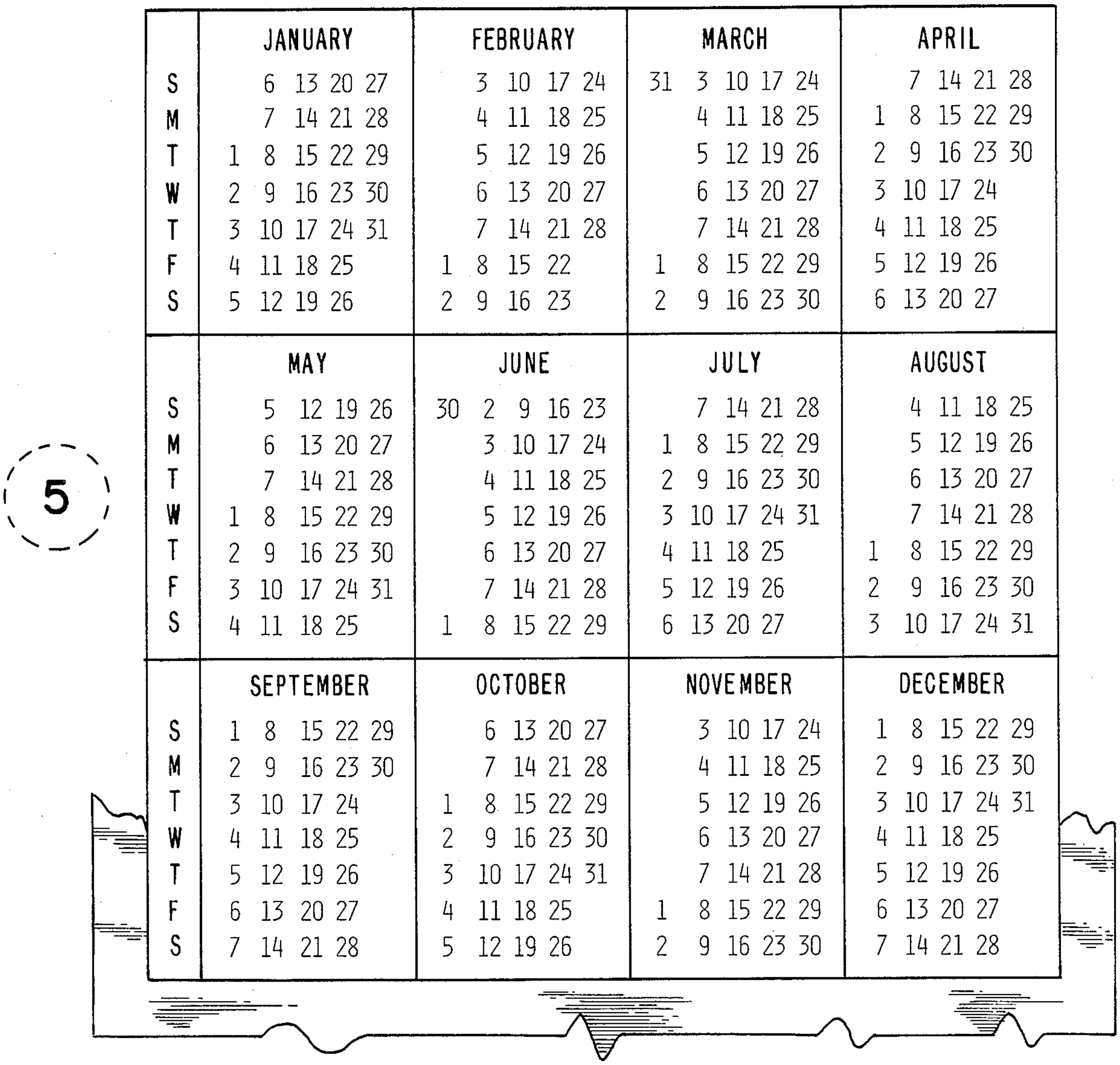
Figure 3F:
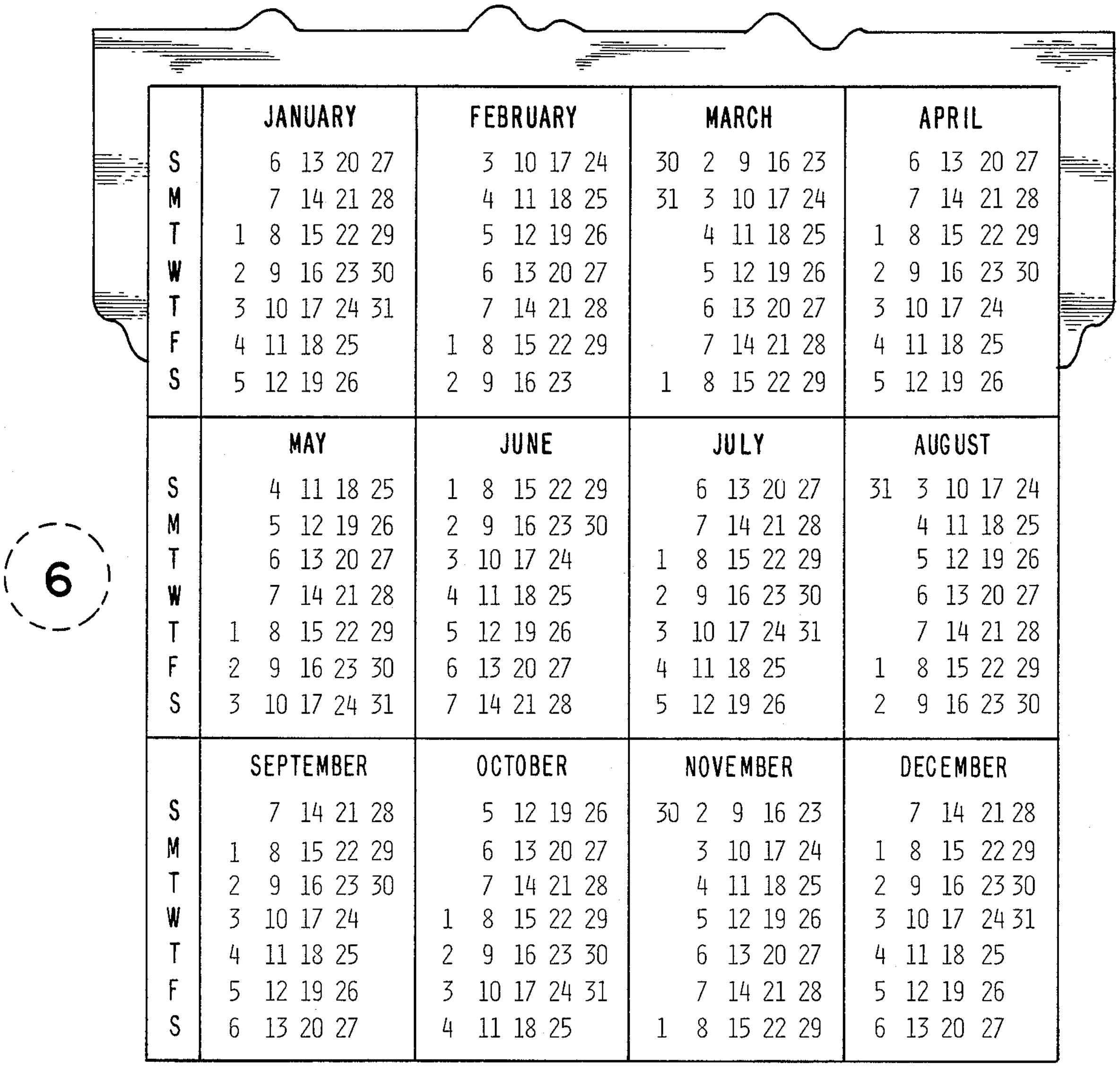
Figure 3H:
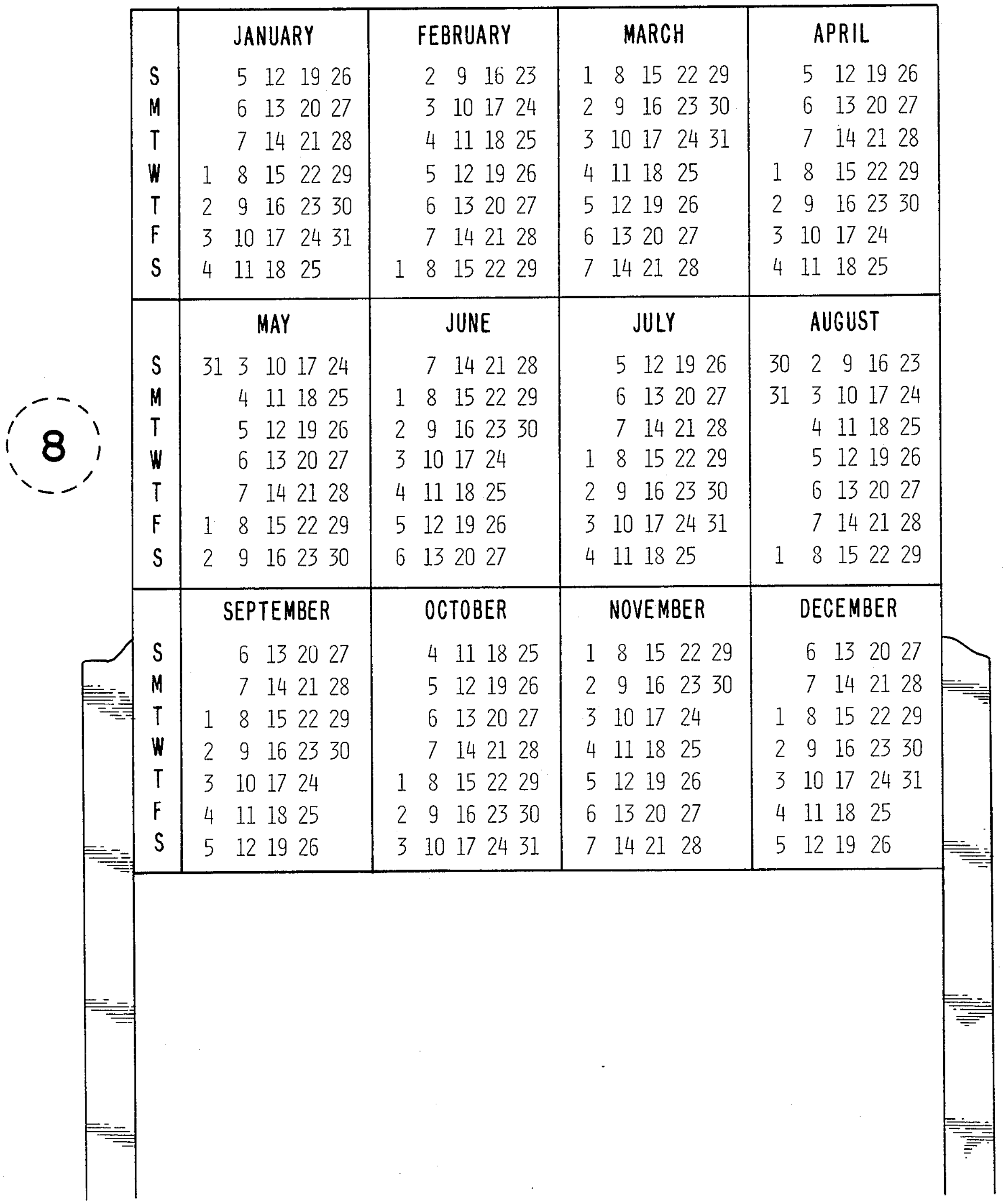
Figure 3I:
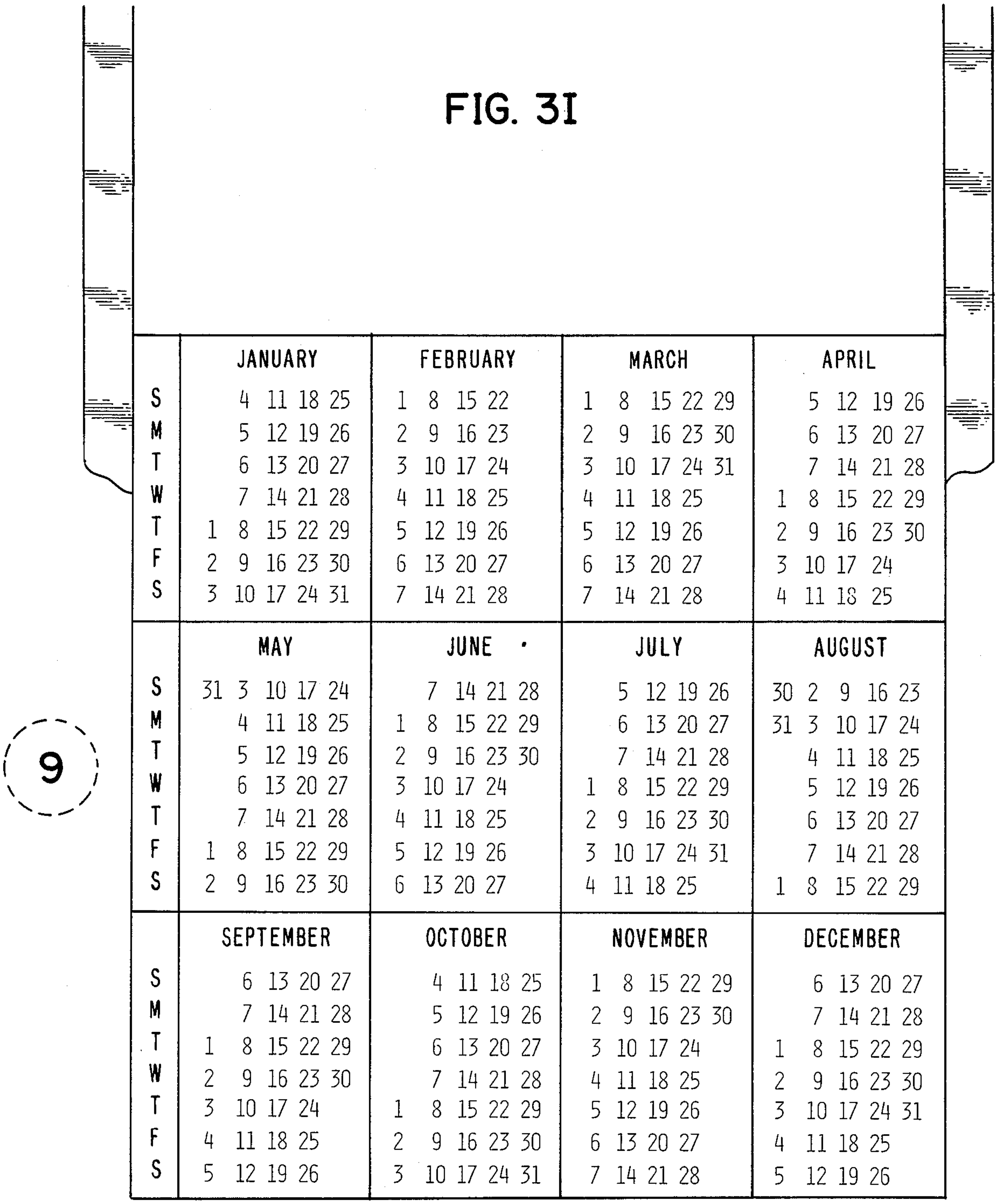
Figure 3J:
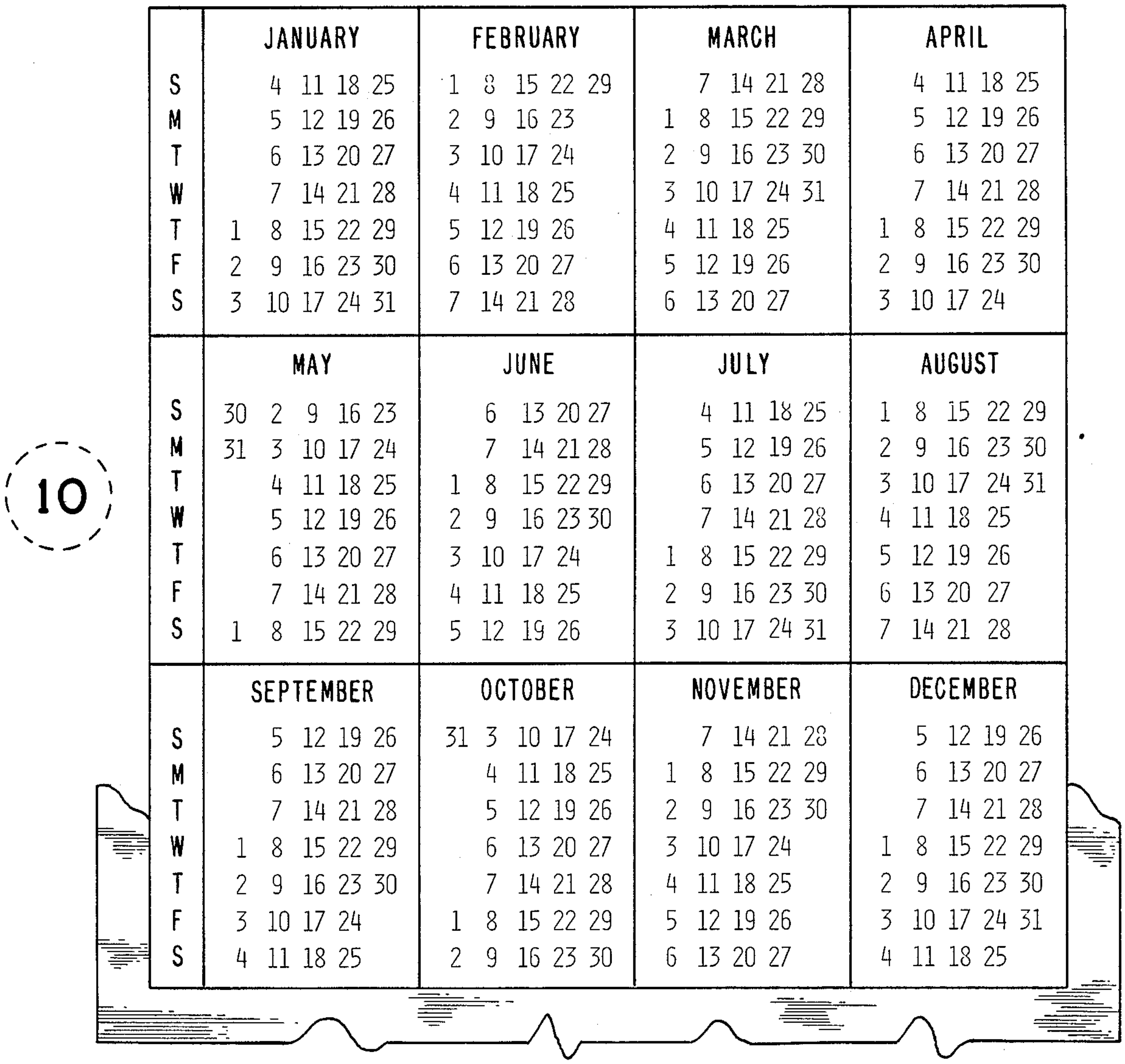
Figure 3N:
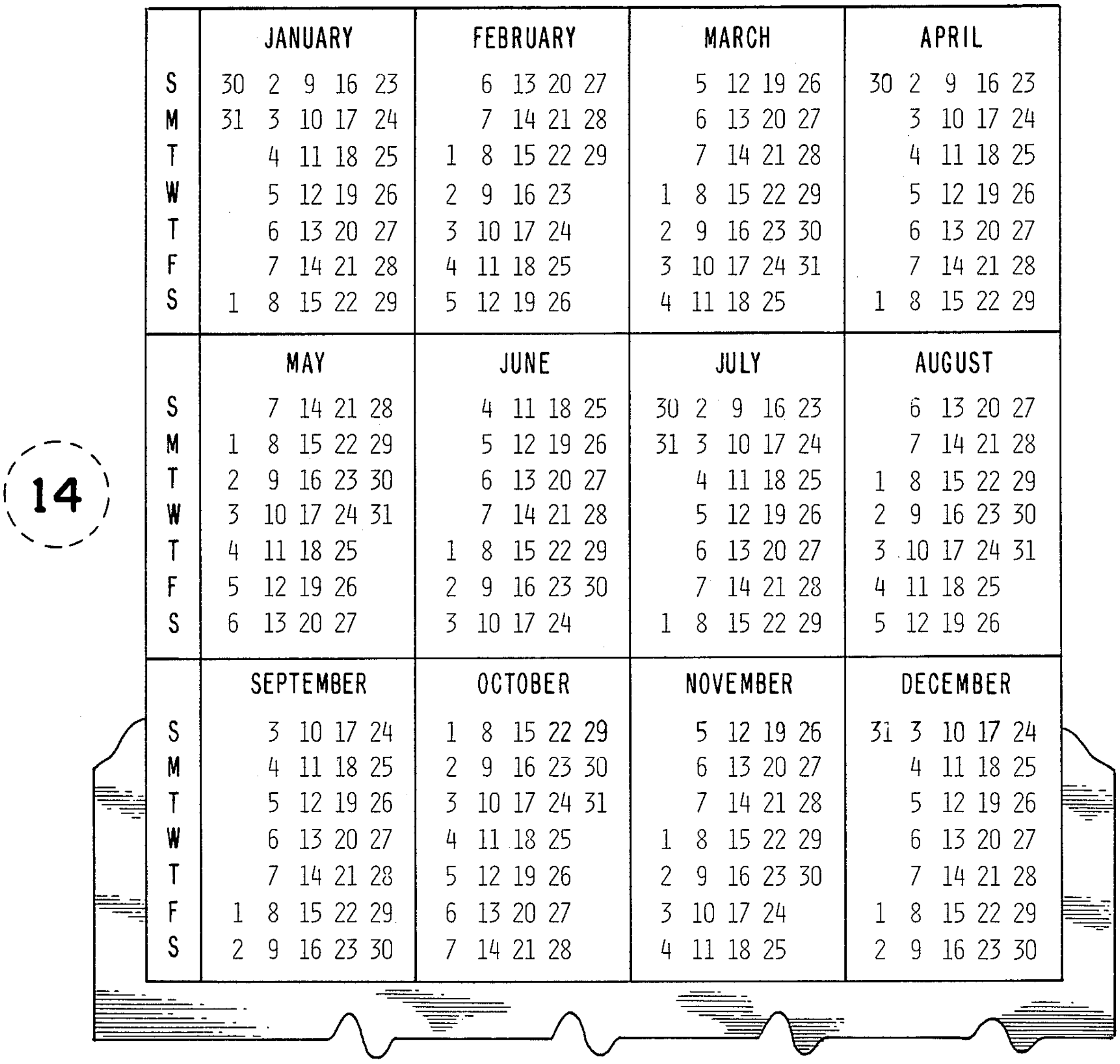

An example of the calendar years secured to timing belt 24 is shown in FIG. 3 and are secured to timing belt 24 by means of glue or any other suitable securing means.

Figure 2:
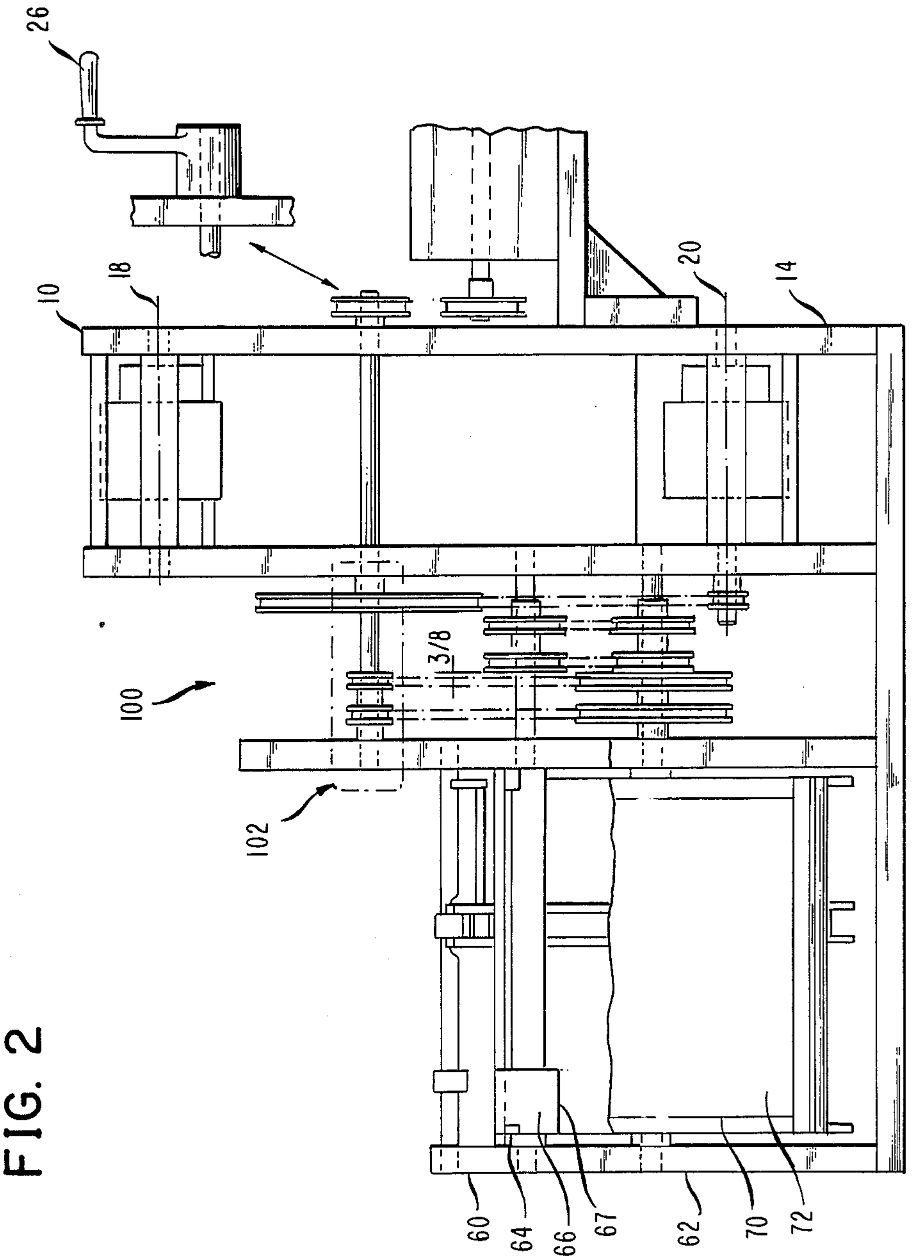
FIG. 2 is a cutaway perspective view of a first embodiment of the calendar year chamber coupled to the index chamber.

Referring to FIG. 2, there is shown a side elevational cutaway view of the entire improved calendar assembly. Calendar year chamber 10, as previously discussed with respect to FIGS. 1 and 2, is secured to an index chamber 60 by means of a mechanical sprocket chamber 100 which contains therein a series of belt and pulleys as will be described hereafter.

Refering to FIG. 2, and, in particular, index chamber 60, there is shown a housing 62, enclosing index cube 64. Index cube 64 has secured on its top, front, bottom and back faces, 65, 66, 67 and 68, respectively, centennial digit indices 65A, 66A, 67A and 68A as shown in FIG. 4. Each face contains four centennial digits indexed to the side of each face. Rotatable cube 64 is rotated by means of lever arm 26 on calendar year chamber 10 by means of the mechanical sproket chamber 100 as descibed hereafter.

Also enclosed within index chamber 60 is a horizontal cylindrical index member 70 whose longitudinal circumferential side 72 is apportioned into four equal longitudinal quadrants, each quadrant on index cylinder 70 has secured thereto, an index calendar system for years one through ninety-nine to be used in conjunction with centennial digit indices 65A, 66A, 67A and 68A.

Rotatable cube 64 and index cylinder 70 are in synchronous rotation through the use of lever arm 26 on calendar year chamber 10 by means of mechanical sprocket chamber 10.

Rotatable cube 64 and index cylinder 70 are rotated by means of lever arm 26 through the mechanical sprocket assembly chamber 100 which comprises a series of pulleys and belts such that the rotation of lever arm 26 causes rotatable cube 64 and index cylinder 70 to rotate in a synchronous fashion when lever arm 26 is rotated in a clockwise direction. A decoupling clutch 102 permits timing belt 24 to be rotated independently of rotatable cube 64 and index cylinder 70 when lever arm 26 is rotated in a counterclockwise direction.

Referring to FIG. 4, there is shown the centennial digit indices 65A, 66A, 67A and 68A which appear on the faces 65, 66, 67 and 68 respectively of index cube 64. Since calendar years repeat every four hundred years, the centennial indices on the face of cube 64 represent centuries four hundred years apart. The one through ninety-nine year index 65B, 66B, 67B and 68B appear on a quadrant of cylinder 70 and are indexed to the centennial indices.

Figure 5:
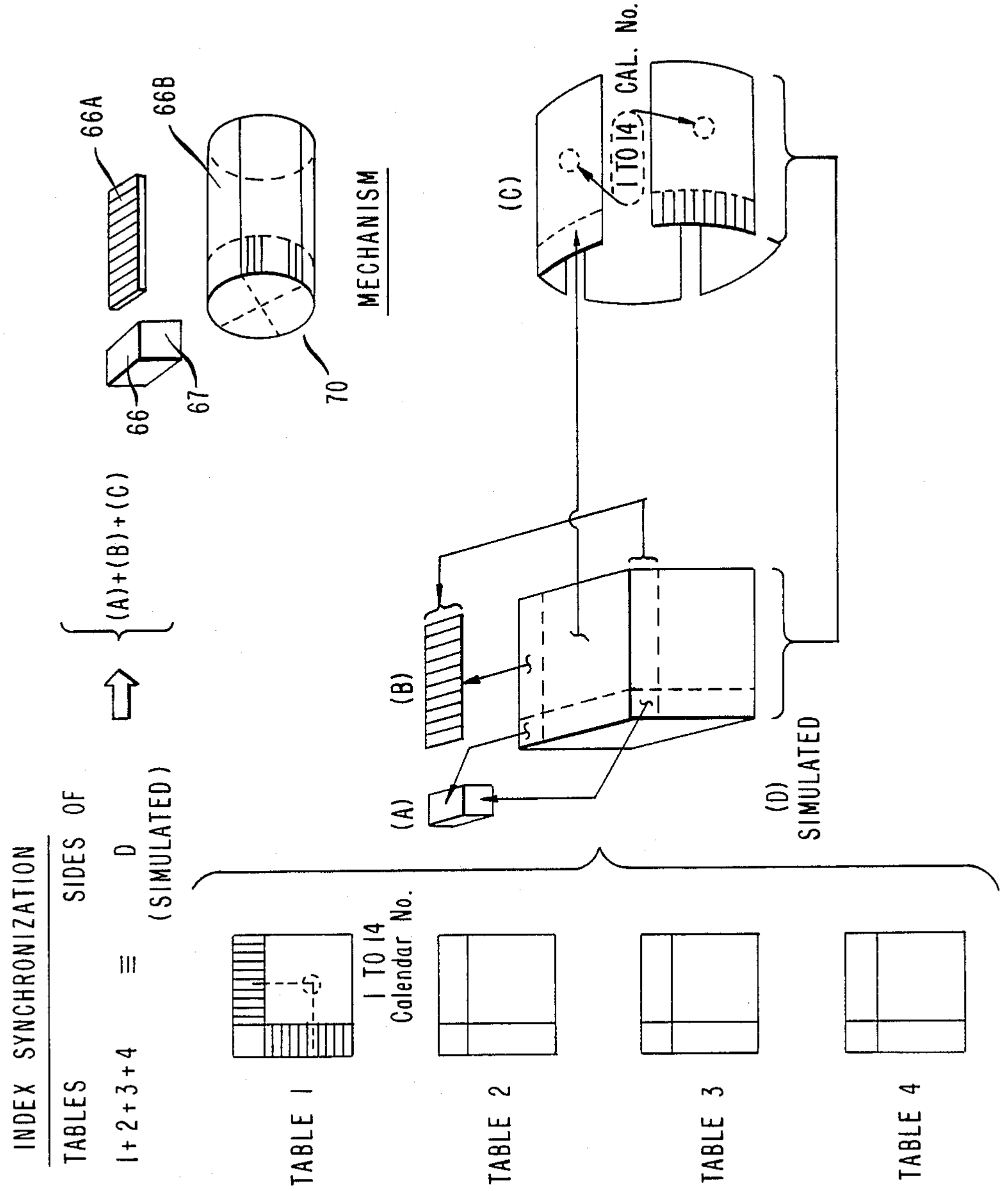
FIG. 5 is a schematic showing the coordination and operation of embodiment 1.

Referring to the schematic, FIG. 5, the operator would manipulate lever arm 26 in order to rotate cube 64 to bring the centennial indices for the particular century into alignment with the particular calendar index for years one through ninety-nine. The operator would then read along the horizontal index, the digit representing the decade in the particular century in question and along the vertical axis, for the particular year in that decade. Cross referencing these to the one through ninety-nine year calendar system, would provide the operator with the numbered calendar year as exemplified in FIG. 3 which would be secured to timing belt 24. This particular calendar year, as a result of the mechanical sprocket assembly chamber 100, would be positioned behind viewing screen 34. The operator can then determine on what day of the week a particular date in a particular year would occur.

Figure 6:
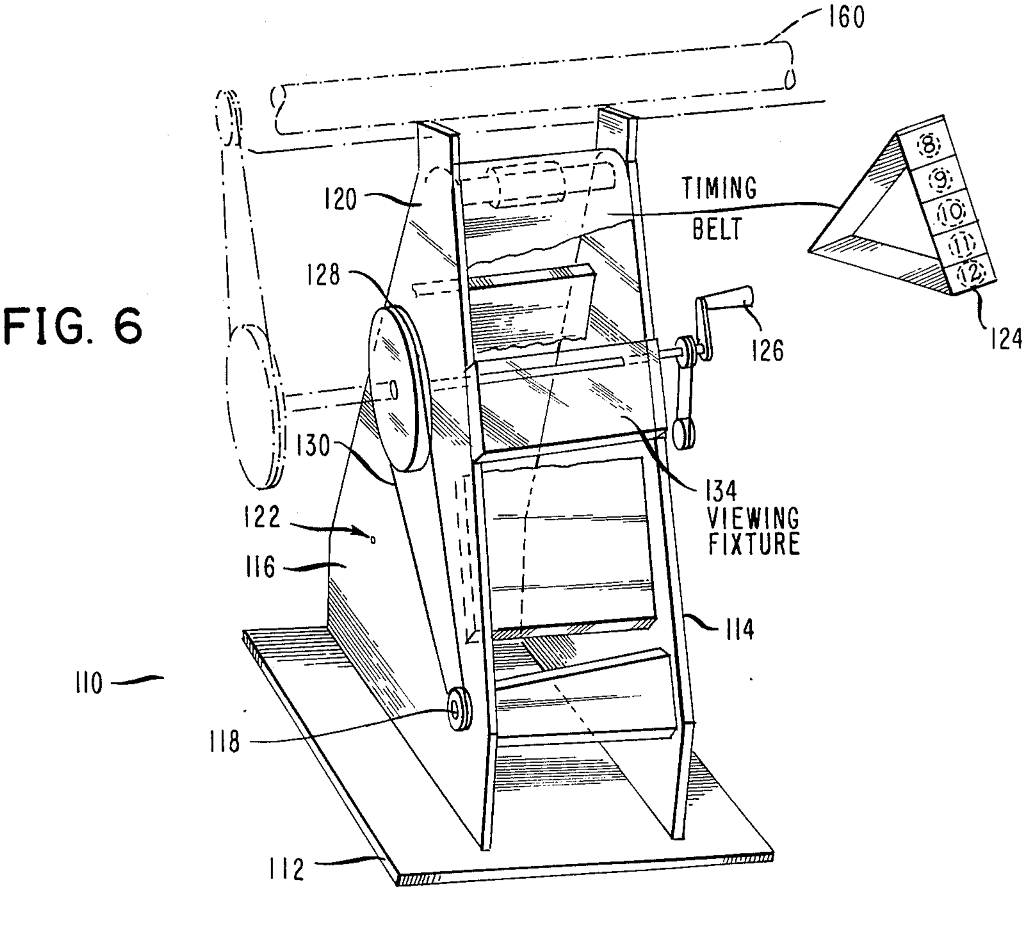
FIG. 6 is a perspective view of a second embodiment of the calendar year chamber.
Figure 10:
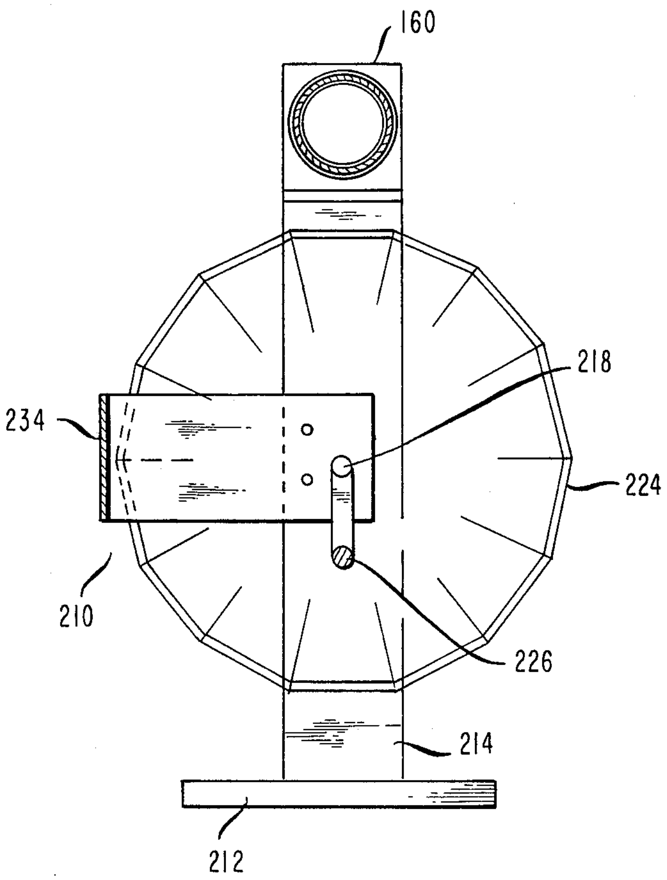
FIG. 10 is a side elevational view of a third embodiment of the calendar year chamber.

Referring to FIGS. 6 and 10, there is shown a second and third ėmbodiment of the present invention which incorporate the day/date calendar year systems exemplified in FIG. 3 but utilize a separate four hundred year indexing system exemplified in FIG. 9, which is disposed vertically above the calendar year assembly. The calendar year chamber described in FIG. 6, and designated generally as 110, comprises a generally planer base 112 supporting two generally triangular side panels 114 and 116 which are perpendicular to base 112. Positioned at the vertices of triangular side panels 114 and 116 and positioned therebetween generally perpendicular thereto are rotatable rollers 118, 120 and 122. Rollers 118, 120 and 122 support a timing belt 124 within calendar year chamber 110. Timing belt 124 is rotated within calendar chamber 110 by means of lever arm 126 which is centrally disposed through side panels 114 and 116 to pulley 128 which in turn is secured by bolt means 130 to roller 118. In this configuration, timing belt 124 is rotated within calendar chamber 110 by movement of lever arm 126 in a clockwise or counterclockwise direction.

A viewing fixture or screen 134 is secured perpendicular between side panels 114 and 116 to index a particular calendar year as shown in FIG. 3, which are secured to timing belt 124. The calendar years from FIG. 3 secured to timing belt 124 are secured by means of glue or any other suitable securing means. Index chamber 160 having a four hundred year calendar index, as shown in FIG. 9, is disposed of vertically above calendar year chamber 110. Index chamber 160 is identical for both the second and third embodiment of the invention and will be described in particular, hereafter.

Referring to FIG. 10, there is shown the third embodiment of the calendar year assembly designated generally as 21. The third embodiment of the calender year chamber comprises a generally planer base plate 212 supporting two side panels 214 and 216 which are perpendicular to base 212. A circular disk 224 is positioned between side panels 214 and 216 and essentially disposed or secured thereto by means of lever rod 218 and lever arm 226 such that the circular disk may be moved by means of lever arm 226 in a clockwise or counterclockwise direction. Secured on the outer surface of disk 224 are the calendar years exemplified in FIG. 3. Disposed outwardly from side panels 214 and 216 is a viewing fixture or screen 234 for indexing the calendar years as exemplified in FIG. 3 which are secured to the outer rim of disk 224.

In both embodiment 2 and 3, FIGS. 6 and 10 respectively, the four hundred year indexing system 160 is positioned vertically above the calendar year chamber 110 and 210 respectively.

Figure 7:
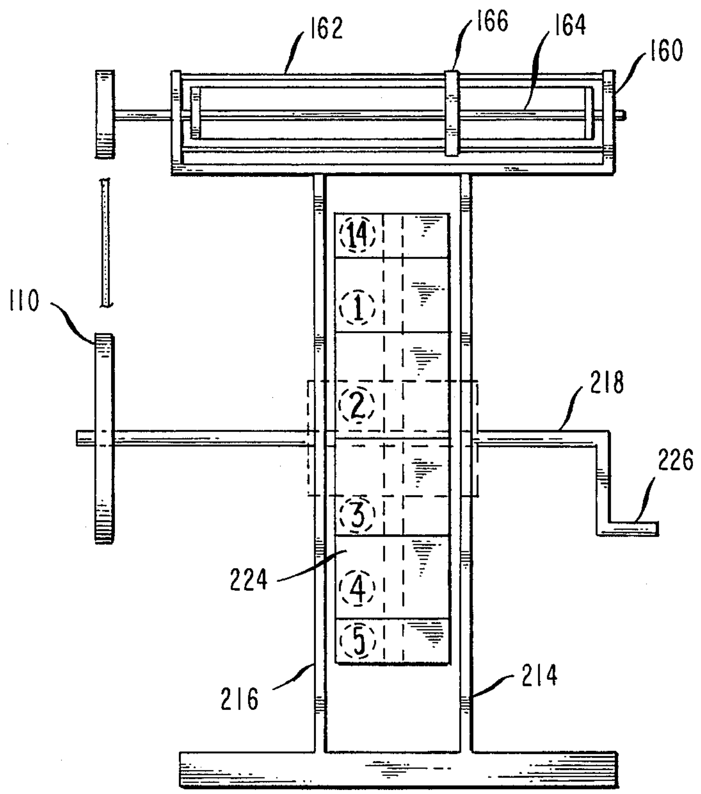
FIG. 7 is a front elevational view of a second embodiment of the calendar year chamber.
Figure 8:
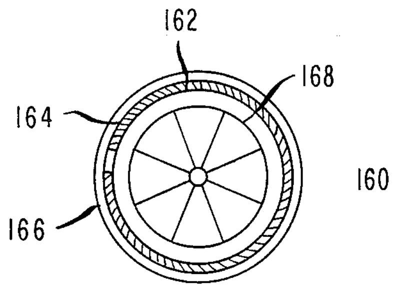
FIG. 8 is a side view of the indexing mechanism for the second embodiment of the calendar year chamber.

Referring now to FIGS. 7 and 8, the indexing system 160 is operated by way of a sprocket means 100 which is secured directly to and rotated by lever arm 126 and 226 respectively. This sprocket means contains a coupling decoupling clutch for rotation of the calendar years secured to timing belt 124 or disk 224.

Referring to FIG. 7 which shows indexing chamber 160 in conjunction with embodiment 3 of the invention and FIG. 8 which shows a cross sectional area of indexing chamber 160, there is shown a static exterior circular member 162 having a longitudinal aperture 164 and an exterior transparent round collar 166 which moves longitudinally, end to end, of static exterior circular member 162. The four hundred year calendar system, as shown in FIG. 9, is secured to rotatable base member 168 which is secured within static exterior circular member 162 and exterior transparent round collar 166. The unique predetermined calendar system Nos. 1 through 14 as shown in FIG. 3 and secured to timing belt 124 rotatable disk 224 is indexed at the intersection of longitudinal aperture 164 and exterior transparent round collar 166.

In operation, the rotation of lever arm 126 in a clockwise rotation, together with the positioning of exterior transparent round collar 166, identifies vertically on indexing chamber 160, the first three digits of the year to be examined as seen in FIG. 9 and the further rotation of lever arm 124 provides for reading of the fourth digit of the year to be examined in the far left column of longitudinal aperture 164.

This provides the operator with the unique index No. 1 to 14 identifying one of the calendar years as shown in FIG. 3. Lever arm 124 is then moved in a counterclockwise direction decoupling index means 160 and the associated predetermined calendar system is viewed through viewing fixture or screen 134 or 234 depending upon whether the second or third embodiment of the invention is being utilized.

While the invention has been described in connection with the exemplary embodiments thereof, it will be understood that many modifications will be apparent to those of ordinary skill in the art and that this application is intended to cover any adaptations or variations thereof. Therefore, it is manifestly intended that this invention be limited only by the claims and the equivalents theeof.

I claim:

1. A hand held or self-supported calendar assembly comprised of:

a rotatable calendar year member consisting of fourteen different calendar year systems mounted coaxially or in tandem with a rotating calendar indexing member furnishing an indexing system; and synchronized drive means for indexing a predetermined calendar year format to permit ascertaining the day of the week of any day of the month of said predetermined calendar year.

2. The calendar assembly as claimed in claim 1, wherein said calendar year member rotates ina triangular or circular contour in calendar chamber synchronously with the indexing member in indexing chamber by chain or belt-driven pulley system.

3. The calendar assembly as claimed in claim 1 wherein said calendar year member and said indexing member are decoupled with a decoupling clutch for identification and coordination.

4. The calendar assembly as claimed in claim 2 wherein said calendar chamber is comprised of a timing belt furnished with the said fourteen calendar systems rotating around the fulcrum of three pulleys.

5. The calendar assembly as claimed in claim 1 wherein said calendar year systems are peripherally mounted on one side surface of said calendar year member.

6. The calendar assembly as claimed in claim 2 wherein said indexing chamber is furnished with a cube and cylinder and rotatably synchronized with the said calendar chamber by the said fulcrum and the pulley system.

7. The calendar assembly as claimed in claim 2 wherein said indexing chamber is tubular and is mounted on the top of calendar chamber with vertically and horizontally disposed base members including orifices for receiving shafts.

8. The calendar assembly as claimed in claim 7 wherein said calendar index member coaxial or in tandem with the said calendar year member is driven by manually or electronically operated rotary mechanism synchronically with the said calendar year member.

9. The calendar assembly as claimed in claim 8 wherein said calendar index member and the said calendar year member are furnished with separate viewing fixtures for identification and coordination of the predetermined calendar system for the specific calendar year.

* * * * *